Patented Mar. 14, 1950

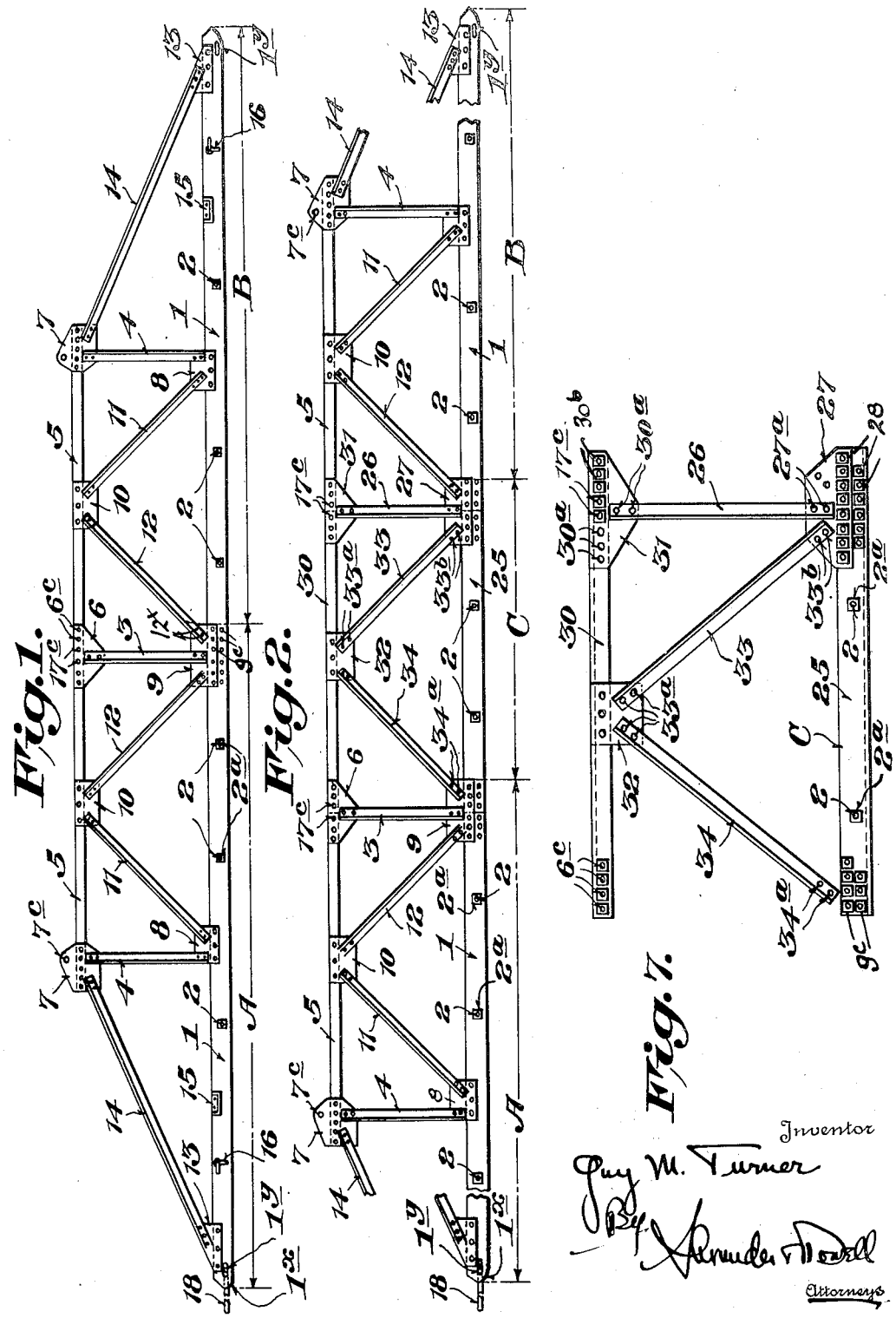

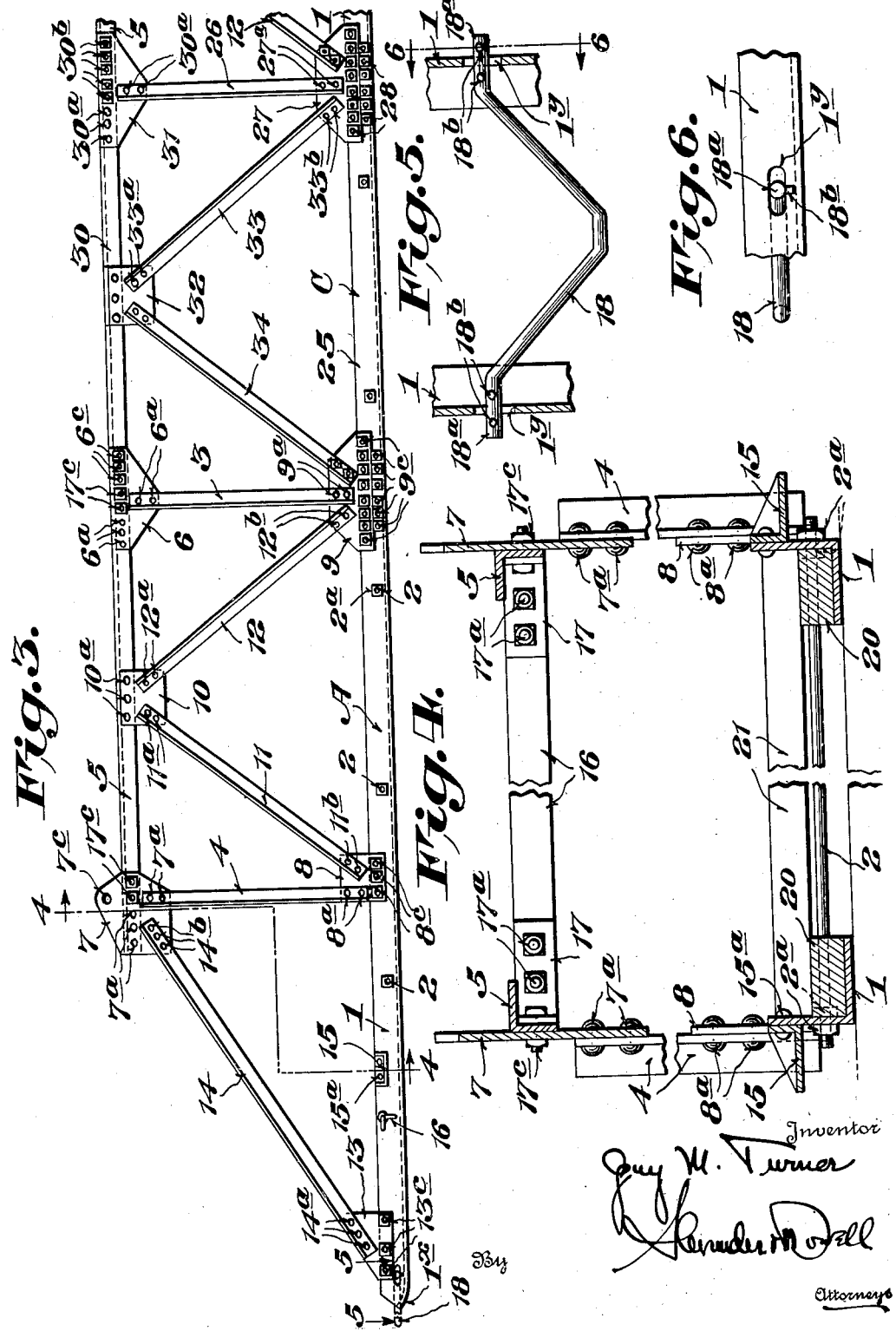

2,500,718

UNITED STATES PATENT OFFICE 2,500,718

TRUSSED SKID

Guy M. Turner, Greensboro, N. C.

Application August 30, 1945, Serial No. 613,617

3 Claims. (Cl. 294—67)

This invention is a novel portable trussed skid, particularly adapted for transporting machines, such as full-fashioned hosiery and similar machines without dismantling same; and the principal object of the invention is to provide a trussed skid of knock-down construction, certain parts of the skid being riveted together and other parts removably bolted together to facilitate the assembly and disassembly of the skid, whereby a machine to be moved may be jacked up even when installed in a factory with very limited aisle space between rows of such machines, and the trussed skid built-up around and under the jacked-up machine, and when the parts of the skid have been assembled with the machine thereon, the skid may be raised by any desired means and moved over the tops of the other machines in the factory and placed upon a suitable trailer or other vehicle and transported to any desired new location, and by reverse order of operations installed in such new location.

Another object of the invention is to provide a knock-down portable trussed skid of the above type having an intermediate removable section whereby the overall length of the skid may be adjusted to suit the length of the machine.

A further object of the invention is to provide a knock-down portable skid of the above type which is exceedingly rigid so as to prevent hogging or sagging of the machine on the skid even when the skid with the machine thereon is lifted at its ends by a gantry or other crane for placement or removal from the trailer or installation, thereby rendering it possible to transport the machines, which are usually of relatively great length and of delicate construction, without damage thereto during moving thereof.

Other minor objects of the invention will be hereinafter set forth.

I will explain the invention with reference to the accompanying drawings, which illustrate one practical embodiment thereof to enable others familiar with the art to adopt and use the same; and will summarize in the claims the novel features of construction, and novel combinations of parts, for which protection is desired.

In said drawings—

Figure 1 is a side elevation of the shorter form of skid, with the removable intermediate section omitted.

Fig. 2 is a similar side elevation of the longer form of skid with the removable intermediate section installed.

Fig. 3 is an enlarged side elevation of one end of the skid shown in Fig. 2 including the removable intermediate section.

Fig. 4 is an enlarged vertical section on the line 4—4, Fig. 3.

Fig. 5 is an enlarged horizontal section on the line 5—5, Fig. 3.

Fig. 6 is a section on the line 6—6, Fig. 5.

Fig. 7 is a side elevation of the removable intermediate section, detached.

As shown in Fig. 1, the truss consists of two end sections A and B which are bolted together at their abutting ends, the sections being substantially identical except at the abutting ends; while in Fig. 2 the skid is shown as comprising the same sections A and B with however the removable intermediate section C, shown more particularly in Fig. 7, disposed therebetween.

The end section A comprises spaced lower chords 1, preferably heavy angle bars shown more particularly in Fig. 1 with the horizontal flanges extending inwardly, said lower chords 1 having spaced holes in their vertical legs for the reception of spacing rods 2 which are threaded at their ends to receive nuts 2a to maintain the chords 1 in parallel spaced relation, the nuts 2a being disposed at opposite sides of the flange. Adjacent the inner ends of chords 1 are vertical rods 3 of desired height; and adjacent the mid-point of chords 1 are similar vertical rods 4 of same height as the rods 3, the rods 3 and 4 being connected at their upper ends by top chords 5, preferably formed of angle irons, the chords 5 being connected thereto by means of plates 6 and 7 respectively riveted to the adjacent portions of the chords 5 and adjacent ends of rods 3 and 4 as indicated, to form a unitary structure, said rivets being indicated by the numerals 6a and 7a respectively.

At the lower ends of rods 4 are plates 8 secured thereto by rivets 8a (Fig. 3) while at the lower ends of rods 3 are plates 9 secured thereto by rivets 9a (Fig. 3). Adjacent the mid-points of chords 5 are plates 10 secured thereto by rivets 10a (Fig. 3) to form a unitary structure. Extending downwardly from the plates 10 in opposite directions are braces 11 and 12 secured to the plate 10 by rivets 11a and 12a (Fig. 3), the braces 11 being secured to plates 8 by rivets 11b, and the braces 12 secured to the plates 9 by rivets 12b, as indicated. Adjacent the outer ends of lower chords 1 are triangular plates 13, and braces 14 are secured to the plates 13 by rivets 14a and to the plates 7 by rivets 14b.

Each of the plates 8, 9 and 13 overlap at their lower ends the vertical flanges of lower chords 1, and are secured thereto by removable bolts 8c, 9c and 13c, respectively, so that the lower chords may be entirely removed from the plates 8, 9 and 13 for convenience in assembling and erecting the skid around the machine to be moved.

In the upper ends of plates 7 are holes 7c whereby the respective end portions of the skid may be engaged with the lifting hooks of a gantry or other crane for lifting and lowering purposes. At the sides of the lower chords 1, intermediate the plates 13 and 8, are jack feet 15 (Figs. 3 and 4) secured thereto by rivets 15a, the jack feet being disposed above the horizontal flanges of the chords 1 for convenient engagement with jacks in initially elevating the ends of the skid during assembly or axial movement thereof, and adjacent the jack feet 15 are hooks 16 connected with the chords 1 by eyelets or the like whereby the skid also may be lifted or lowered, or the machine or load anchored on the skid.

As shown in Fig. 1 the opposite end section B is generally similar to end section A, except that the abutting ends, and therefore similar parts are similarly numbered. The plates 6 and 9 of the section A are substantially symmetrical at opposite sides of the vertical rods 3, and therefore in section B the plates 6 and 9 are omitted, the inner ends of lower chords 1 of the section B being secured directly to the plates 9 of section A by means of bolts 9c, and the upper chords 5 of section B being secured by bolts 6c to the plates 6 of section A, while the lower ends of braces 12 of section B are secured to the plates 9 of section A by means of bolts 12x, the chords 1 and 5 of the sections A, B abutting, as shown. If desired bosom angles (not shown) may also be supplied over the abutting ends of the chords 1 and 5 in order to enhance the rigidity of the skid; otherwise section B is identical with section A, and sections A and B are adapted to be bolted together at their inner ends by the bolts 9c, 6c and 12x.

In order to maintain the spacing between the top chords 5, I provide at spaced intervals top spreaders 16, Fig. 4, having angle clips 17 at their opposite ends secured by bolts 17a said clips 17 being also bolted to the top chords 5 by bolts 17c, whereby the spreaders 16 are removable from the assembly.

As shown, the outer ends of the lower chords 1 are preferably bent upwardly as at 1x so as to facilitate pulling the skid along the floor or other surface; and in the vertical flanges of the lower chords 1 are opposed elongated slots 1y (Figs. 5 and 6) adapted to receive the ends of a substantially V-shaped bail 18 having its ends 18a disposed in axial alignment and provided with spaced depending lugs 18b adapted to extend below the bottoms of the slots 1y when the bail is in horizontal position shown in Fig. 6 to prevent the ends from moving laterally out of engagement with the slots 1y in the lower chords 1, but when the bail is swung upwardly the lugs 18b may be readily passed through the slots 1y to remove or assemble the bail. The use of the spaced lugs 18b at each end of the slots 1y also prevents distortion of the adjacent end of the skid when a pull on the bail is exerted in the act of moving the skid along the ground or along the supporting surface.

As shown in Fig. 4, in the bosoms of the lower chords 1 extending throughout the lengths of the sections A and B are filler strips 20 of wood which may be secured by bolts or screws to the chords 1 to maintain same in position thereon, the fillers also materially adding to the rigidity of the skid. Between the fillers 20 are cross beams 21 (Fig. 4) preferably of wood spaced at intervals to support the feet of the machine being carried by the skid, which feet may be secured to the beams 21 in any desired manner, the cross-beams 21 being securely bolted to fillers 20. If desired, narrow strips would be secured to the tops of the cross-beams 21 at opposite sides of alternate feet of the machine so as to prevent axial movement of the machine on the skid.

In operation using the skid shown in Fig. 1, assuming that a machine is to be removed from its installation in one factory to another factory, the machine would first be jacked up slightly above its normal installed position, which may readily be done even though aisle space between adjacent rows of machines is very slight. After the machine is jacked up the lower chords 1 of the sections of the disassembled skid would then be positioned with relation to the sides of the machine, and while in such position the stay bolts 2 would then be assembled to secure the lower chords 1 in spaced relation, and the lower row of bolts 9c inserted to secure the ends of chords 1 of the section together. The cross-beams 21 would then be positioned on the filler strips 20 to underlie the feet of the machine, and then the machine would be lowered so that the feet would rest on the cross-beam 21. The sides of the skid would then be assembled on the lower chords 1 by placing the sides in proper position thereon and inserting the bolts 13, 8c and the upper row of bolts 9c; also inserting bolts 6c in position to secure the chords 5 of section B to the plate 6. The top spreaders 16 would then be secured in position and secured by bolts 17c between the spaced top chords 5 of the skid.

When thus assembled the skid is extremely rigid because of its trussed construction, and hogging and sagging of the skid and machine thereon is prevented while the skid is being raised utilizing holes 7c, hooks 17, or a pull exerted on the bail 18. Thus the skid with the machine thereon may be readily raised up over the tops of the other machines in the factory and removed from the factory, placed upon a trailer or other truck or transporting vehicle and removed to its new location, whereupon by reversing the above operations the machine may be readily installed in its desired new location at its point of destination.

In order to adjust the length of the skid to suit different lengths of machines to be transported, a removable intermediate section C, shown detached in Fig. 7, may be inserted between the sections A and B as shown in Figs. 2 and 3. Section C comprises a lower chord 25 of angle iron similar to the chords 1 of sections A and B and having holes for the reception of the stay bolts 2. As the inner ends of the sections A and B are not identical one end of section C is made to correspond with the inner end of section B, while the opposite end of section C corresponds with the inner end of section A.

At one end of section C are vertical rods 26 secured to plates 27 by rivets 27a, Fig. 7, the plates 27 having bolt holes for receiving bolts 28 which pass through the plates 27 and the vertical flanges of the lower chords 25. Plates 27 are of same size and shape as the plates 9 of section A, Fig. 3, and the bolt holes are similarly spaced so that the inner end of section B may, when desired, be secured to the adjacent end of section C as in Fig. 2. Section C also has top chords 30 of angle bars similar to the top chord 5 of sections A and B and chords 30 are connected to the vertical rods 26 by means of plates 31, rivets 30a passing through plates 31 and adjacent ends of top chords 30 and vertical rod 26 so as to be permanently secured thereto. Plates 31 are identical in shape and size with the plates of section A so that the inner end of section B may be secured to section C in the same manner that it is secured to the inner end of section A, by means of bolts 30b (Figs. 3 and 7).

At the mid-point of top chords 30 are plates 32 similar to the plates 10 of sections A and B, and diagonal braces 33 are secured between the plates 32 and 27 by means of rivets 33a and 33b; also oppositely inclined diagonal braces 34 extend between the plates 32, the lower ends of the braces 34 corresponding with the braces 12 of the section B and having holes 34a at their lower ends for the bolts which secure the braces 34 to the plates 9 of section A in the same manner that the diagonal braces 12 of section B, Fig. 2, are secured to the plates 9. The adjacent ends of the top chords 30 are similarly provided with spaced holes for bolts 6c which secure the top chords 30 of section C to the plates 6 of section A in the same manner that the upper chords 5 of section B are secured to said plates 6. The lower chords 25 of section C are similarly provided with fillers 20 and cross-beams 21, and top spreaders 16 would be secured between the top chords 30 by means of bolts 17c, Fig. 7, in the same manner as the spreaders for the top chords 5 of sections A and B are secured.

When the sections A, B and C are thus bolted together the rigid skid structure is provided upon which a long machine may be placed, and moved from location to location without hogging or sagging which would injure the machine. Since the ends of the intermediate removable sections C correspond with the inner ends of the sections A and B respectively, obviously the parts may be readily assembled or disassembled in the same manner that the sections A and B, Fig. 1, are assembled.

In assembling the skid shown in Figs. 2 and 3 around the machine the same procedure above outlined would be followed with the exception that the lower chords 25 of section C would be interposed between the lower chords 1 of sections A and B and secured together by bosom bars or the like in addition to the bolts 9c and 28; and the side members of section C consisting of the chords 30, vertical rods 26 and the diagonal braces 33 and 34 as a unit would then be assembled on the aligned and positioned lower chords 25 prior to assembly of the top spreaders.

While I have shown but one intermediate section C, obviously two or more intermediate sections may be used, and the intermediate section may be of any desired length. When the parts are assembled the trussed construction prevents warping or sagging or weaving of the frame, the parts of which are securely held together by the top spreaders, the spacing bolts 2a, cross-beams 21, and the bolted connections between the parts at the various plates 6, 8, 9, 13, 27 and 31.

When not in use the skid may readily be dismantled, and the parts stored in relatively small space for convenience, it requiring only a short time to secure the various parts together or to dismantle the same. Owing to the knock-down feature my truss may be readily used for removing machines of the above type from closely adjacent rows in factories or the like, since the truss may be built up around the machine which is to be removed after the same has been jacked up above the floor level by any suitable jacking means sufficient to permit the assembling of the parts of the skid around and under the machine.

I do not limit my invention to the exact forms shown in the drawings, for obviously changes may be made therein within the scope of the claims.

I claim:

1. A knock-down portable skid for transporting machinery, comprising truss sections each having lower and top chords, rods, and braces; removable means securing the adjacent ends of the lower and top chords of the sections together; removable means maintaining the lower chords of the sections in spaced relation; removable means maintaining the top chords of the sections in spaced relation; cross-beams extending between the lower chords of the sections to support the machinery; the lower chords of the sections being detachable from their related top chords, rods and braces to permit assembly of the skid around and under the machinery when the latter is jacked up; said lower chords comprising angle bars; the outer ends of the bars being bent upwardly; said bars having opposed elongated slots adjacent their outer ends; and a bail having its ends aligned and passing through said slots; said ends of the bail having offset lugs thereon disposed at opposite sides of the slots.

2. A knock-down portable skid for transporting machinery, comprising end truss sections having lower and top chords, rods, and braces; a removable intermediate truss section having lower and top chords, rods, and braces; the ends of the intermediate section conforming with the inner ends of the said end sections respectively; means for removably securing the adjacent ends of the lower and top chords of the sections together; removable means maintaining the lower chords of the sections in spaced relation; removable means maintaining the top chords of the sections in spaced relation; cross-beams extending between the lower chords of the sections to support the said machinery; the lower chords of the sections being detachable from their related top chords, rods and braces, whereby the skid may be built-up around and under the machinery when the latter is jacked up; said lower chords comprising angle bars; the outer ends of the bars being bent upwardly; said bars having opposed elongated slots adjacent their outer ends; and a V-shaped bail having its ends aligned and passing through said slots; said ends of the bail having offset lugs normally disposed at opposite sides of the slots and adapted to pass through said slots when the bail is inclined into one position.

3. In a trussed skid, lower chords comprising angle bars; the outer ends of the bars being bent upwardly; said bars having opposed elongated slots adjacent their outer ends; and a V-shaped bail having its ends aligned and passing through said slots; said ends of the bail having offset lugs normally disposed at opposite sides of the slots and adapted to pass through said slots when the bail is inclined into one position.

GUY M. TURNER.

(References on following page)

REFERENCES CITED

The following references are of record in the file of this patent:

UNITED STATES PATENTS

| Number | Name | Date |
|---|---|---|
| 1,026,059 | Smith | May 14, 1912 |
| 1,377,667 | Cary | May 10, 1921 |
| 1,637,960 | Romine | Aug. 2, 1927 |
| 1,733,728 | Fullerton | Oct. 29, 1929 |
| 1,772,731 | Romine | Aug. 12, 1930 |
| 2,024,001 | Hamilton | Dec. 10, 1935 |
| 2,099,898 | Larkin | Nov. 23, 1937 |
| 2,376,023 | Bailey | May 15, 1945 |

FOREIGN PATENTS

| Number | Country | Date |
|---|---|---|
| 207,661 | Germany | Mar. 5, 1909 |